No. 710,845. Patented Oct. 7, 1902.
E. M. CUMMINS.
HAND TRUCK.
(Application filed July 17, 1902.)
(No Model.)
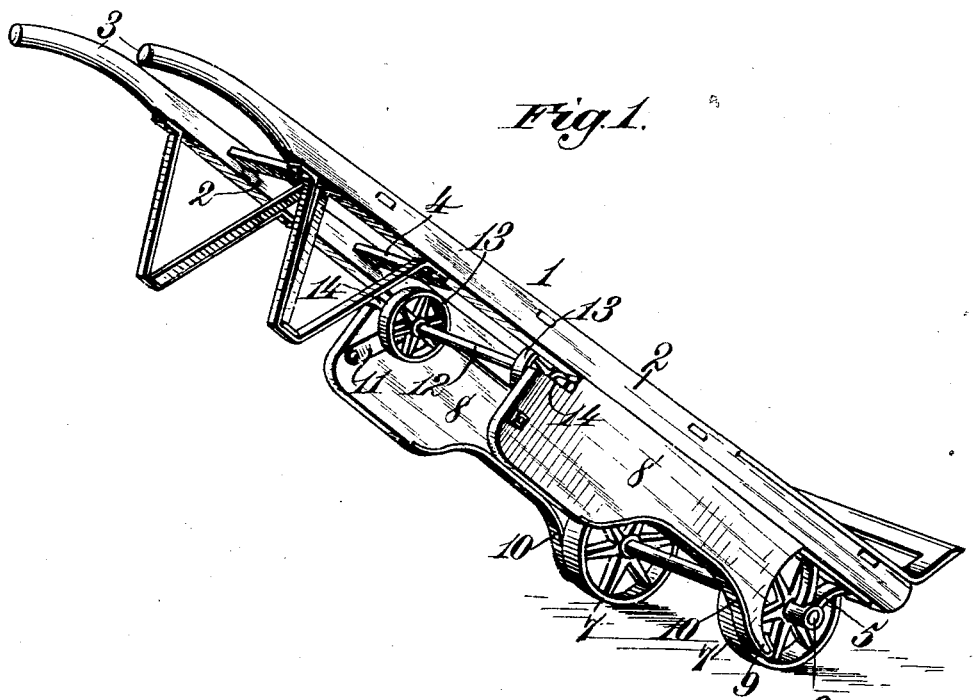
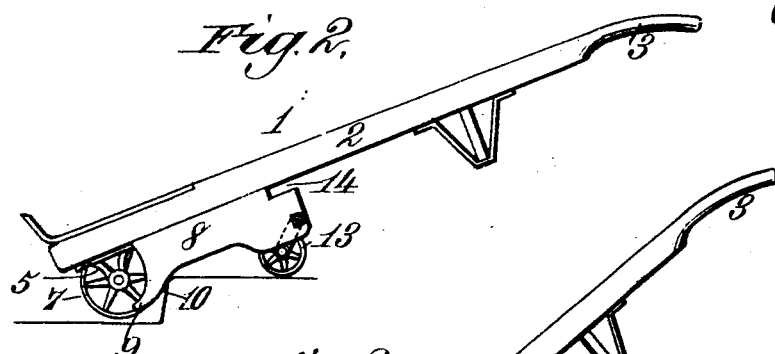
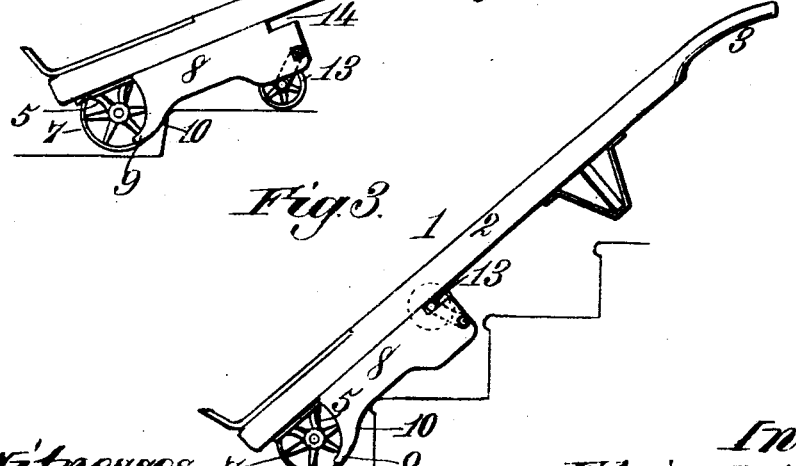
Witnesses:
Robert Everett,
Dennis Sumby.
Inventor:
Edwin M. Cummins,
By James L. Norris,
Atty.
THE NORRIS PETERS CO., PHOTO-LITHO., WASHINGTON, D. C.

UNITED STATES PATENT OFFICE.

EDWIN M. CUMMINS, OF SIOUX CITY, IOWA.

HAND-TRUCK.

SPECIFICATION forming part of Letters Patent No. 710,845, dated October 7, 1902.

Application filed July 17, 1902. Serial No. 115,992. (No model.)

*To all whom it may concern:*

Be it known that I, EDWIN M. CUMMINS, a citizen of the United States, residing at Sioux City, in the county of Woodbury and State of Iowa, have invented new and useful Improvements in Hand-Trucks, of which the following is a specification.

This invention relates to hand-trucks, and has for its object to provide a truck with means which enable heavy loads to be wheeled over obstructions, up and down a step, door-sill, curb, or the like, or down a flight of stairs with ease and without jolt or jar.

To this end my invention consists in the features and in the construction, combination, and arrangement of parts hereinafter described and particularly pointed out in the claims following the description, reference being had to the accompanying drawings, forming a part of this specification, wherein—

Figure 1 is a perspective view of my improved truck. Fig. 2 is a view in side elevation, showing the manner of lowering the truck over a curb or the like; and Fig. 3 is a similar view showing the manner of lowering the truck down a flight of steps.

Referring to the drawings, the numeral 1 indicates the frame of the truck, constructed in an ordinary and well-known manner and comprising two side rails 2, terminating at one end in handles 3 and united by transverse rails or cross-bars 4. The truck-frame has attached to its forward end hangers 5, in which is journaled a shaft or axle 6, having fixed thereon wheels 7, as usual.

Rigidly attached to the under sides of the side rails 2, in rear of the wheels 7, are vertically-depending side pieces 8, which may consist of wooden boards or planks or may be made in skeleton form of steel or other suitable material and properly braced and shaped. Each of the side pieces is provided at its lower forward end with a curved extension 9, said extensions lying adjacent to the rims of the wheels 7 and forming, in effect, rearward continuations of said wheel-rims. The lower edges of the side pieces 8 in rear of the extensions 9 are concaved or provided with curved recesses 10 for the purpose hereinafter described.

To the inner side of the rear end of each of the side pieces 8 is pivoted one end of an arm 11, and passing through bearings in the other or free ends of said arms is a shaft 12, that has fixed thereon, near its ends, relatively small wheels 13. The ends of the shaft 12 project beyond the wheels 13, whereby when said wheels are in operative position the ends of the shaft 12 will rest against the lower edges of the side pieces and relieve the pivots of the arms 11 from all strain. In the rear upper ends of the side pieces are mortises 14, formed by rabbeting or cutting away the upper rear corners of said side pieces, the pivots of the arms 11 being so located that when said arms are swung upward and rearwardly the ends of the shaft 12 will lie in the mortises 14 and will hold the wheels 13 out of operative position.

By concaving the under sides of the side pieces 8 in the manner shown and described the operator is enabled to easily handle a heavy load, for the cut-away portions of the side pieces permit the front wheels 7 to drop from one step to another without jar or jolt, the curved extensions and the curved edges 10 gliding easily over the edges of the steps and depositing the wheels 7 on the steps lightly and without shock. When the truck is wheeled on the wheels 7 in the usual manner, the arms 11, and with them the shaft 12 and wheels 13, are turned up until the shaft engages the mortises 14 and will rest therein by gravity, thereby holding the wheels 13 up out of the way. When it is desired to wheel the truck over obstructions or up or down a step, sill, curb, or the like, the arms 11 and the shaft and wheels are swung down until the ends of the shaft rest against the bottoms of the side pieces. Then by using the wheels 13 as fulcrums the front wheels 7 may be raised up to clear the obstruction or to pass over or upon the step, sill, or curb. The wheels 13 may be quickly and conveniently thrown into and out of operative position by the operator engaging the shaft 12 with the toe of his shoe and swinging the parts in the desired direction. It will be noted that the rear wheels 13 when in operative position are slightly nearer the front than the rear end of the truck, and hence when the truck is tilted or rocked on the wheels 13 as fulcrums the greater part of the load will be in rear of the fulcrums and render the operation of tilting the truck easy. In drawing the front end of the truck up and over a curb, step, or sill, or the like the curved extensions 9 will ride easily over the edge of said obstruction and will gradually and smoothly guide the wheels 7 upon and over such obstruction. The concavities on the lower edge of the side pieces are only useful in lowering a load down a stairway. For most other general purposes the concavities may be dispensed with and the side pieces made straight on their lower edges.

Having described my invention, what I claim is—

1. A truck comprising a frame provided with wheels at its front end and handles at its rear end, side pieces pendent from the sides of the frame in rear of said wheels, said side pieces being concaved on their lower edges and having downwardly and forwardly curved extensions approximately conforming to the lower and rear sides of the wheels, substantially as described.

2. A truck comprising a frame provided with wheels at its front end and handles at its rear end, side pieces pendent from the sides of the frame in rear of the front wheels, said side pieces being concaved on their lower edges, wheels carried by the rear ends of the side pieces, means for shifting said rear wheels to a position above the lower rear edges of the side pieces, and means for holding said wheels in such position, substantially as described.

3. A truck comprising a frame provided with wheels at its front end and handles at its rear end, side pieces pendent from the sides of the frame in rear of the front wheels, said side pieces being concaved on their lower edges and having downwardly and forwardly curved extensions approximately conforming to the lower and rear sides of said wheels, wheels carried by the rear ends of the side pieces, and means for moving the rear wheels into and out of operative position, substantially as described.

4. A truck comprising a frame provided with wheels at its front end and handles at its rear end, rigid side pieces pendent from the sides of the frame intermediate said wheels and the center of said frame, wheels carried by the rear ends of the side pieces, means for moving the rear wheels to a position above the lower rear edges of the side pieces, and means for holding said wheels in such position, substantially as described.

5. A truck comprising a frame provided with wheels at its front end and handles at its rear end, side pieces pendent from the sides of the frame intermediate said wheels and the center of the truck, arms pivoted to the rear ends of the side pieces, a shaft journaled in the free ends of the arms, wheels fixed on the shaft, and means for holding the rear wheels out of operative position when the said arms are swung rearwardly and upwardly, substantially as described.

6. A truck comprising a frame provided with wheels at its front end and handles at its rear end, side pieces pendent from the sides of the frame intermediate said wheels and the center of the truck, arms pivoted to the inner sides of the rear ends of the side pieces, a shaft journaled in the free ends of the arms, wheels fixed on the shaft near the ends of the latter, the ends of the shaft resting against the lower edges of the side pieces when the arms and rear wheels are lowered and means for holding the rear wheels out of operative position when the said arms are swung rearwardly and upwardly, substantially as described.

7. A truck comprising a frame provided with wheels at its front end and handles at its rear end, side pieces pendent from the sides of the frame intermediate said wheels and the center of the truck, mortises formed in the upper rear ends of the side pieces, arms each pivotally secured at one end to the rear portion of one of the side pieces, a shaft journaled in the free ends of the arms, and wheels fixed on said shaft near the ends of the latter, the ends of the shaft resting against the lower edges of the side pieces when the arms are swung downward and resting in said mortises when the arms are swung upward, substantially as described.

In testimony whereof I have hereunto set my hand in presence of two subscribing witnesses.

EDWIN M. CUMMINS.

Witnesses:
R. M. DOTT,
C. W. TAYLOR.